Feb. 19, 1924.

C. F. BETZ

1,484,205

METHOD OF AND MACHINE FOR MAKING PASTRY CONES

Filed July 10, 1919    4 Sheets-Sheet 1

Inventor:
CHARLES F. BETZ,
John H. Bruninga
His Attorney.

Feb. 19, 1924.

C. F. BETZ 1,484,205

METHOD OF AND MACHINE FOR MAKING PASTRY CONES

Filed July 10, 1919     4 Sheets-Sheet 2

Inventor:
CHARLES F. BETZ,
By John H. Bruninga
His Attorney.

Feb. 19, 1924.

C. F. BETZ

1,484,205

METHOD OF AND MACHINE FOR MAKING PASTRY CONES

Filed July 10, 1919     4 Sheets-Sheet 3

Inventor:
CHARLES F. BETZ,
By John H. Bruninga
His Attorney.

Patented Feb. 19, 1924.

1,484,205

UNITED STATES PATENT OFFICE.

CHARLES F. BETZ, OF ST. LOUIS, MISSOURI.

METHOD OF AND MACHINE FOR MAKING PASTRY CONES.

Application filed July 10, 1919. Serial No. 309,851.

*To all whom it may concern:*

Be it known that I, CHARLES F. BETZ, a citizen of the United States, and residing at St. Louis, Missouri, have invented the new and useful Improvement in Methods of and Machines for Making Pastry Cones, of which the following is a specification.

This invention relates to baking methods and machines, and more particularly to methods and machines for making pastry cones.

In the manufacture of pastry cones, the batter is poured into hot molds, hot cores are inserted to form the batter and the whole is subjected to heat in order to bake the batter to form the baked product in the forms of cones. Now batter contains moisture and when, therefore, the batter is discharged into the hot molds and comes in contact with the hot cores, steam is formed which, if it is not allowed to escape, will form blow holes and imperfections thereby causing the cones to leak. A pastry cone should be compressed while being baked, but the pressure should be applied gradually, and preliminarily the pressure should be so light as to permit the escape of the steam and any air which may be entrapped. While the batter is baking, the pressure should be applied but provision should be made for a yielding relatively of the molds and cores so as to permit of expansion during the baking operation.

In a machine of this type, difficulty is experienced in properly removing and more particularly, breaking from and insuring the complete removal of the baked product from the cooperating molds and cores. This is particularly true in the baking of ice cream cones because it is preferable that no grease be employed whatsoever in order that the baked product may be more palatable. The baked product, however, adheres closely to the mold and cores so that considerable force is necessary to break or separate the cores and molds from the baked product so that frequent breakage occurs, requiring shutting down of the mechanism. When it is remembered that the proper baking of cones by machinery requires uniform heating, it will be readily understood what a break down or stopping means in again requiring the adjustment of the machine for uniform operation on the baked product.

One of the objects of this invention, therefore, is to develop a method of making pastry cones in cooperating mold-core baking elements whereby a uniformly baked and coherent product is obtained.

Another object is to provide a machine of this type which will be simple in construction, automatic in its action and reliable.

Further objects will appear from the detail description taken in connection with the accompanying drawings, in which.

General structure.

Figures 1, 4:
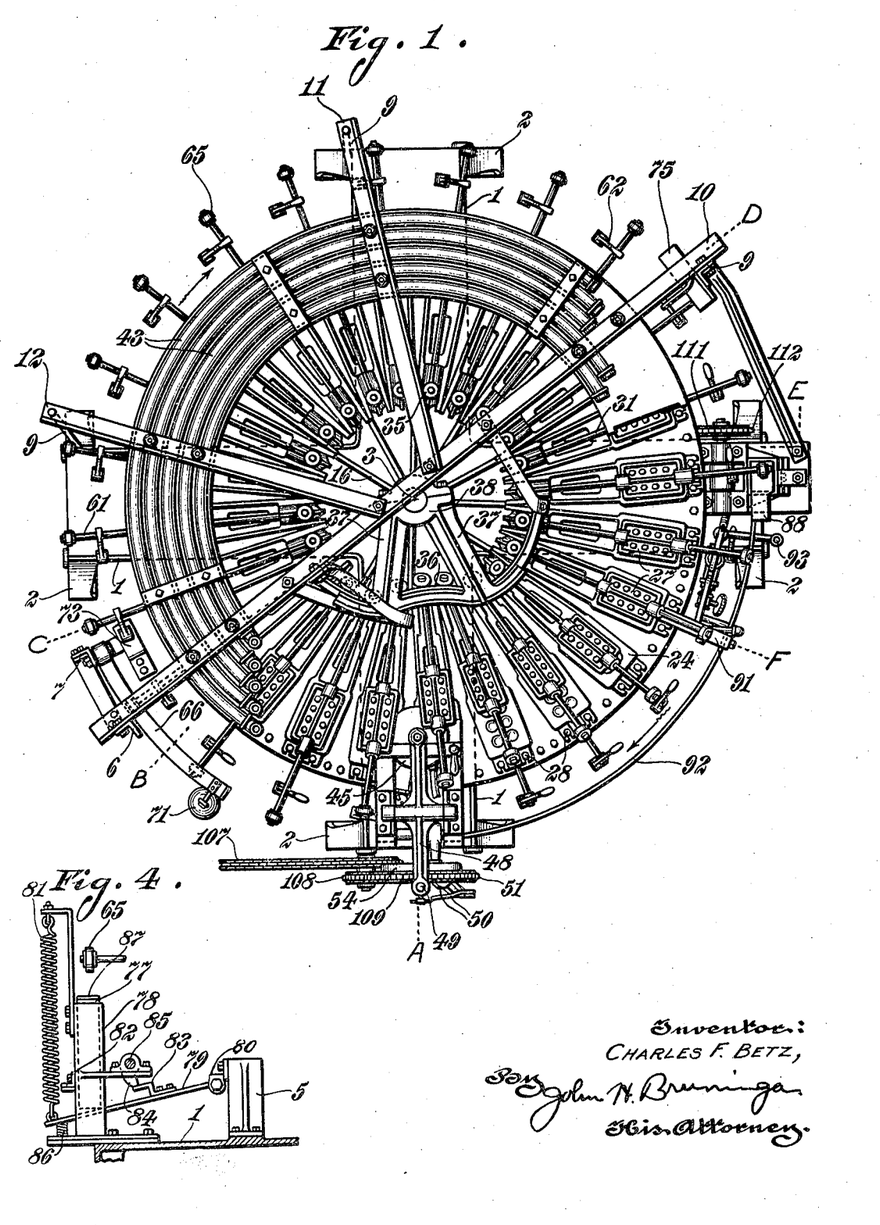
Figure 1 is a plan of a machine embodying this invention.
Figure 4 is a detail of Figure 1, the same being a side elevation and showing the breaking mechanism.
Figure 2:
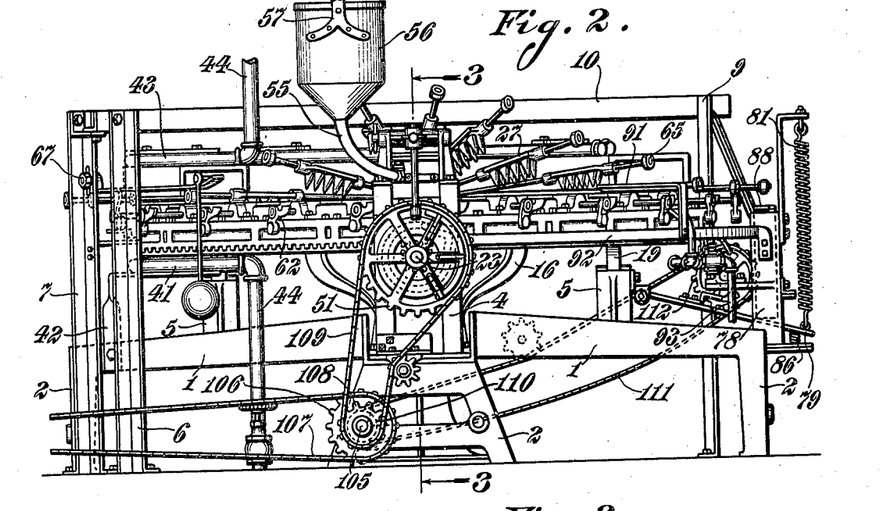
Figure 2 is a side elevation.
Figure 3:
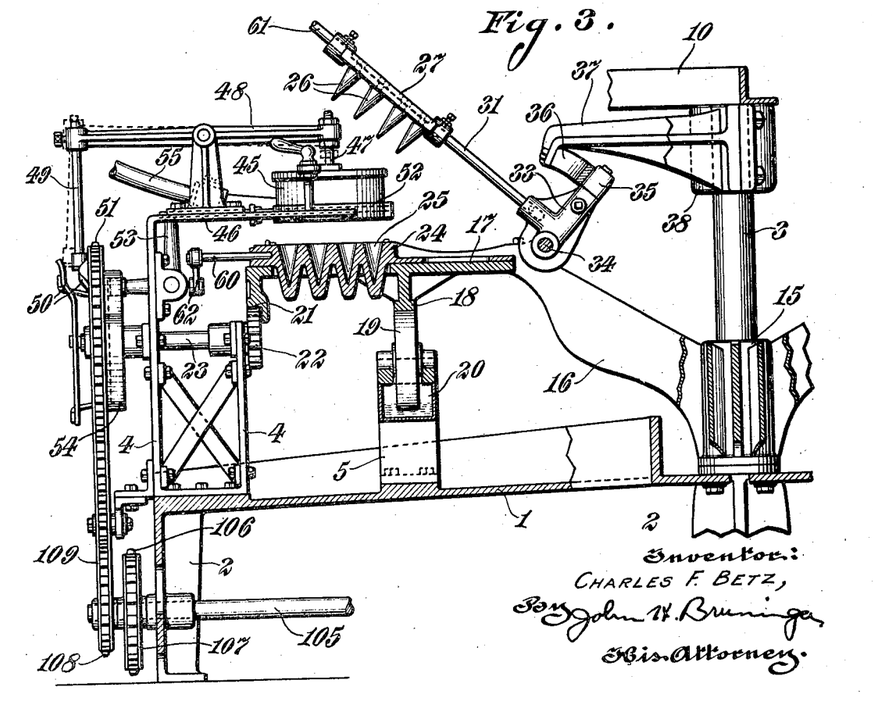
Figure 3 is an enlarged section on the line 3—3, Figure 2.

Referring to the accompanying drawings, and more particularly to Figures 1, 2 and 3, 1 designates a frame which is supported on legs 2 in order to form a base. This frame is provided with a central column 3, standards 4, and brackets 5. There are further provided standards 6, 7 and 9 supporting beams 10, 11 and 12.

The baking elements.

Mounted for rotation on the column 3 is a hub 15 having radial arms 16 connected by an annular web 17 which is provided with a track 18 resting on rollers 19 journalled in the brackets 5; the brackets 5 are hollow and are provided with recesses 20 for receiving lubricant in which the rollers run. The frame thus formed is provided at its outer circumference with a depending toothed flange 21 meshing with a pinion 22 on a shaft 23 mounted in bearings in the standards 4. Accordingly, the shaft 23 operates to impart a slow rotary movement to the frame.

Figure 7:
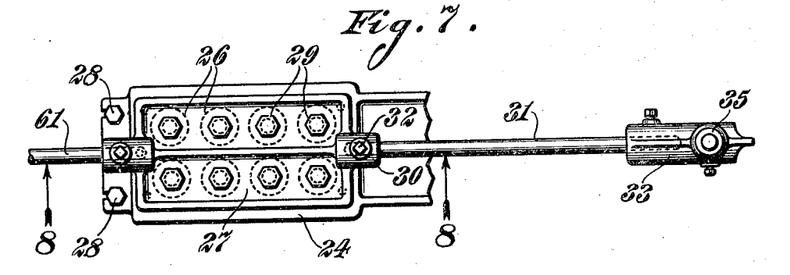
Figure 7 is a detail plan view of a mold and a core.
Figure 8:
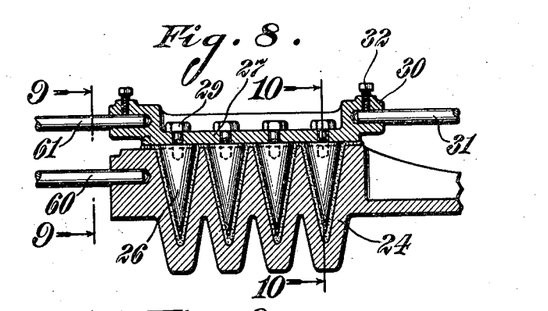
Figure 8 is a section on the line 8—8, Figure 7.
Figure 9:
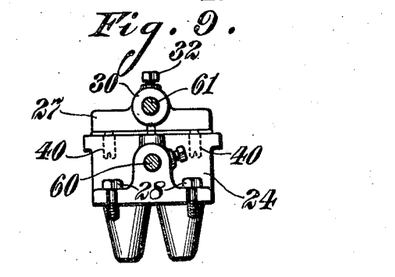
Figure 9 is a section on the line 9—9, Figure 8.
Figure 10:
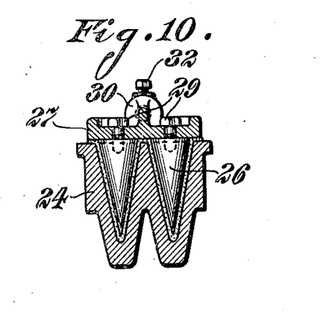
Figure 10 is a section on the line 10—10, Figure 8.

The web 17 of the traveling frame is provided with a series of radially extending recesses for receiving the molds 24, each of which is provided with a series of cone-shaped mold cavities 25 for cooperation with cores 26 on a core support 27. The molds are removably mounted on the traveling frame by means of screws 28 so that they can be readily replaced. The cores 26 are secured to the core support 27 by means of screws 29.

Each core support is provided with a boss 30 receiving one end of a steel shank 31 on which the core support is clamped by means of a set screw 32. The other end of the shank 31 is similarly clamped in a carrier 33 which is pivotally mounted on a short shaft 34 mounted in bearings on the traveling frame and embracing the carrier. The carrier is provided with a cam roll 35 which engages the cam 36 mounted on radial arms 37 connected with a hub 38 clamped on the column 3. The cam is thus stationary and is supported in the path of the cam roll 35 connected with the core supports so that during the movement of the traveling frame, the cores will be lifted out of the mold and will again be allowed to drop therein.

In order to align each core support with its mold, each mold is provided with a pin or dowel tapered at its end and cooperating with a corresponding recess in the core support. In order to maintain the lower face of the core support slightly separated from the upper face of the mold, the mold is provided with a number (in this case, four) of screws 40, the ends of which are adapted to project above the mold face and form stops for limiting the movement of the core support and provide the required space between the faces of the mold and core support for a purpose hereinafter to be described. By providing a series of these stops, they can be independently adjusted so as to uniformly space the cooperating faces. The connection between the shank 31 and the core support permits relative adjustment of the cores with respect to the mold cavities in order to accurately align the cores with these cavities.

The oven may be of any suitable construction comprising lower gas burner pipes 41 supported on brackets 42 on the base 1 and upper gas burner pipes 43 supported from the beams 10, 11 and 12. Gas is supplied to these pipes from main supply pipes 44. These burner pipes extend circumferentially about, and semi-circularly above and below the traveling frame.

*The batter-feeding means.*

Referring to Figures 1, 2 and 3, 45 designates a receptacle or cylinder which is supported from an overhanging support 46 formed on the standard 4. This receptacle has traveling therein a piston, the rod 47 of which is connected to one end of a lever 48, the other end of which has a shank 49 provided with a cam roll engaging the cam 50 on a sprocket 51 fixed to the shaft 23. The feeding valve 52 is operated from a bell crank lever 53 which engages another cam 54 on the sprocket 51. Batter is supplied onto the cylinder 45 by means of a pipe 55 from a tank 56 sustained by straps 57 from an overhead support.

This batter feeding mechanism is fully described in application Serial No. 309,852, filed of even date herewith, which has become Patent No. 1,347,073, dated July 20, 1920, and a detail description thereof is, therefore, unnecessary; suffice it to say that the batter feeding mechanism is jacketed to keep the same cool in order to prevent thickening of the batter and that it is operated in timed relation with the mechanism heretofore and hereinafter to be described.

*The baking elements actuating devices.*

Figure 5:
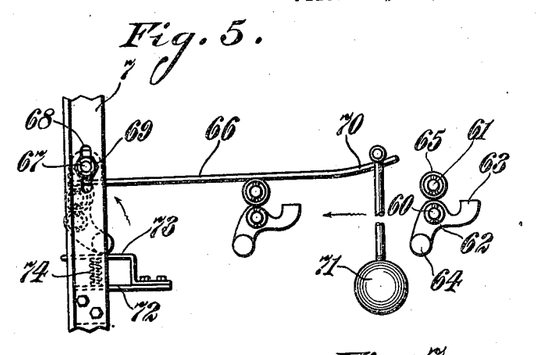
Figure 5 is a detail showing the locking mechanism.
Figure 6:
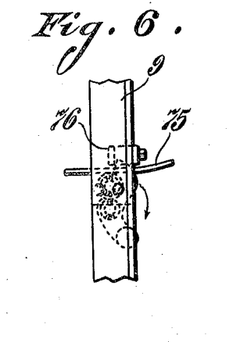
Figure 6 is a detail showing the unlocking mechanism.

Referring to Figures 1 to 7 inclusive, each mold is provided with a steel shank 60, while each core support is provided with a steel shank 61, these shanks projecting radially from the molds and core supports, the shank 61 projecting beyond the shank 60. Each shank 60 has mounted thereon a locking device 62 which has an overhanging hook 63 adapted to take over the shank 61 when the shanks are brought close together, when the core support contacts with the mold and when the shanks have been slightly sprung. Each locking device is also provided with a tail piece 64 which is weighted so that when the locking device is released, it will remain in released position as shown at the right of Figure 5.

Each shank 61 has at its outer end a cam roll 65 adapted to engage a cam 66 mounted on the standard 7. This cam is pivoted at its lagging end on a pivotal support 67 which is adjustably mounted in a slot 68 in the standard 7 and is secured in adjusted position by a nut 69. The free end of the cam flares upwardly as shown at 70 and has mounted thereon a weight 71. The standard 7 also has mounted on a bracket 72 a yielding wiper or plate 73 which is spaced from the bracket and additionally sustained by a spring 74 and this plate is in the path of the tails of the locking devices.

Mounted on one of the standards 9 in the path of the rolls 65 is a stationary cam 75 and adjacent this cam but in the path of the hooks of the locking devices is a stationary stop 76.

Mounted on the base 1 and in the path of the rolls 65 is an impact member 77 mounted for vertical movement in the guide 78 resting on the free end of a lever 79 pivoted on a bracket 80 on the frame 1. The lever 79 is normally raised by a spring 81 and when so raised is held against a stop 82. The lever 79 is provided with a lug 83 in the path of a cam 84 on a shaft 85. A buffer spring 86 is mounted on the base of the guide 78. The impact member 77 is provided with a facing 87 which has an extension 88, in the direction of movement of the traveling frame. This impact mechanism is substantially of the character shown and described in application Serial Number 269,706, filed January 4, 1919.

When the traveling frame moves in the direction of the arrow and after the cam roll 35 on a given core support carrier has left the cam 36, so that the cores are positioned in the mold and rest therein, the cam roll 65 on the end of the core support will engage the yielding cam 66 so as to close the cooperating baking elements, and after these are closed the tail of the locking device 62 engages the plate or wiper 73 and the hook of the locking devices takes over the shank 61, both shanks 60 and 61 springing during this operation as shown in Figure 5. When the cooperating baking elements reach the position shown in Figure 6, the engagement of the cam roll 65 with the cam 75 will first spring the shank 61 down so as to release the locking device; this locking device now releases by gravity, but in order to make the action more positive, the stop 76 located in the path of the hook of the locking device positively secures its disengagement.

When the cam roll 65 comes opposite the impact element 77, the cam 84 will, at this time, be in the position shown in Figures 1 and 4 and as this cam leaves the lug 83, the lever 79 will be released and under the tension of the spring, the impact element will be thrown upwardly to strike against the cam roll 65. The extension 88 is so located with reference to the leading end of the cam 36 that as the cam roll 65 on the core support leaves the extension (which is directed upwardly to move the core support still further) the cam roll 35 on the core support carrier will engage the cam and lift the cores out of the mold.

*Mechanism for separating the baked product from the molds.*

Figures 11, 12, 13, 14, 15:
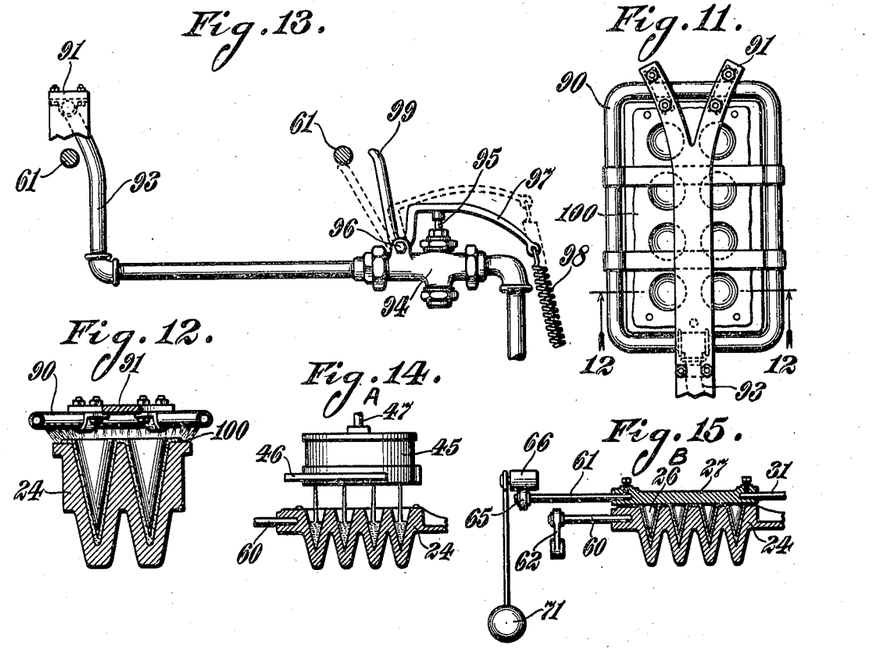
Figure 11 is a plan view of the means for separating the baked product from the mold.
Figure 12 is a section on the line 12—12, Figure 11.
Figure 13 is a detail showing the connections for applying an air blast to the separating means.
Figures 14 to 19 inclusive are diagrammatic details showing the steps in the method and in the operation of the apparatus embodying this invention.
Figure 16:
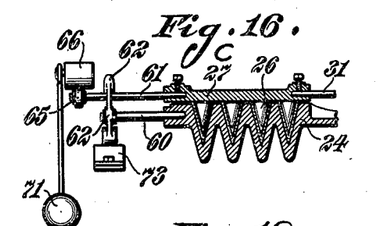
Figure 17:
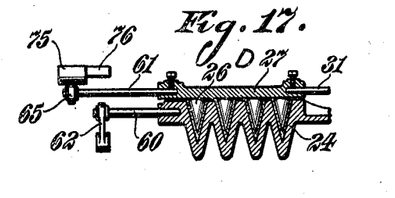
Figure 18:
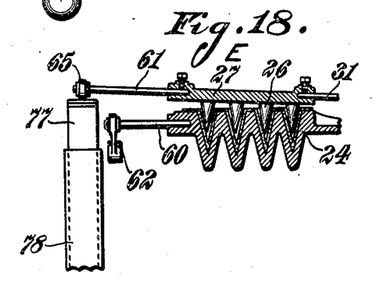
Figure 19:
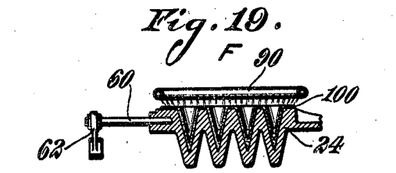

This mechanism is substantially of the same construction as described in the application Serial Number 269,706, and is shown in Figures 11, 12 and 13. It comprises briefly a pipe loop 90 mounted on a bracket 91, supported from a circumferentially extending beam 92 from the standard 4 and the guide 78. This loop is positioned to encircle a mold and has in its lower face a series of apertures adapted to direct a series of jets obliquely but inwardly directed on the upper face of the mold and against the edge of the baked product, this loop being so positioned that a mold passes under the same after the cores have been withdrawn therefrom. The loop has a compressed air pipe connection 93 having arranged therein a valve 94 which is normally closed by spring or air pressure. The valve stem 95 is engaged by a bell crank lever pivoted at 96 on the valve casing and one arm 97 of this bell crank lever is connected to a spring 98 anchored at its lower end, while an upwardly extending arm 99 is in the path of the shanks 61 and the core supports. The normal tension of the spring 98 is such as to cause the valve 94 to remain closed.

As described in the application Serial Number 269,706 the batter supplied to the mold cavities is sufficient so that when the article is pressed to shape and baked, there will be formed a web 100 connecting the cones at the top, this space being provided by the separating stops 40 heretofore described, in order to permit complete removal of a set of cones from a set of mold cavities in a single mold.

During the operation of the machine and after the cores have been separated from the baked product and after these cores have been raised to clear the mold, the mold with the baked product therein will be moved underneath the looped pipe to the position shown in Figures 11 and 12. Prior thereto, the shank of the succeeding core support will have engaged the arm 99 thereby swinging the bell crank lever and raising the arm 97 from the valve stem against the tension of the spring 98; upon further movement of the shank, the bell crank lever will be released just as the mold moves under the loop thereby causing the spring to return the bell crank lever so that its arm 97 will strike the valve stem and quickly open the valve to admit air under pressure to the loop. The opening of the valve is, however, for an instant only as it closes immediately after the blow is delivered. This will cause jets of air under high pressure to be directed on the mold face at and against the edges of the web connecting the cones, and this will operate by the air entering underneath the web at its edges to receive the web and with it the cones so as to separate and loosen them from the molds.

*The driving mechanism.*

Referring to Figures 1, 2 and 3, 105 designates a main drive shaft which has a sprocket 106 driven by a chain 107 from any suitable source of power. This shaft 105 has also fixed thereto a sprocket 108 connected by a chain 109 with a sprocket 51, so as to drive the shaft 23 and the pinion 22 and the cams 50 and 54 connected therewith, in order to rotate the traveling frame and operate the batter feeding mechanism. A sprocket 110 on the shaft 105 is connected by a chain 111 with a sprocket 112 on the shaft 85 so as to operate the impact member 77. It is, of course, understood that all mechanisms are so connected as to be driven in timed relation.

*Résumé of operations.*

Referring more particularly to Figures 1 and 14 to 19 inclusive, and beginning with the position A, when a given mold is directly underneath and in alignment with the feeding mechanism; at this time the batter feeding mechanism is operated to deposit predetermined quantities of batter in the mold cavities. As the given mold moves from the position A to the position B, the cores will drop by gravity into the mold cavities of the given mold and they are allowed to settle therein by gravity. At this time the cores only rest by gravity in the mold so that the batter is allowed to flow upwardly and settle around the cores and at this time the steam, which is formed by the moisture in the batter, is permitted to issue thereby permitting the remaining batter to settle and fill any blow holes which might otherwise be formed. The result is, therefore, that at the time that the mold and cores have reached the point where the cam roll is about to engage the cams 66, the steam and whatever air may be present will have been ejected from the mold cavity and the cones are now ready to be pressed. As the molds pass along the cam, a gradually increasing but yielding pressure is applied to the cores to force them into the molds and gradually press the batter to shape while it is being preliminarily heated, so that it is insured that all the moisture and air have been driven therefrom and that the proper amount of time is allowed during the preliminary heating. Since the cam 66 is pivoted at its lagging end and is rather flexible and since the shanks 31 and 61 are furthermore resilient, the striking of the cam roll against the flaring part 70 of the cam 66 and the passage along the cam will cause the core-carrying element to be joggled up and down so as to apply an intermittent closing pressure in order to work the batter into the mold while it is being preliminarily heated. At the point of maximum pressure, namely at the end of the cam when the action of the weight is the greatest, that is just before the mold reaches the position C, the locking device will be moved into engagement with the shank of the core support, and by the pressure on the two shanks, they are forced or sprung together at the time that the hook takes over the shank. The baking elements which are now locked together pass along the oven and the batter is baked during this period and while a given element passes from C to D. While the elements are, however, locked together the shank being of springing material allows for a yielding, and, therefore, for a slight expansion of the batter during the baking operation. The product will, therefore, be pressed to shape into the form of cones connected by a web which is allowed to flow between the mold and core faces, on account of the space allowed therebetween by the same as heretofore described. When a given set of baking elements reaches the position D, the locking devices are released by first springing the shanks together and by then providing for the positive knock off as heretofore described. The baking elements are now unlocked and can, therefore, be separated. Thereafter, these elements pass to the position E so as to come into alignment with the impact member, and this impact member will strike against the end of the shank on the core support and by this impact action will break the cores from the baked product leaving the latter in the mold. This impact action insures the breaking of the cores from the baked product and is not only due to the quick action, but also to the inertia of the bakel product. Accordingly, the baked product is left in the mold. As this baked product passes from the position E to the position F, the loosened cores will now be lifted from the mold by the cam 36 so that at the time that a given mold reaches the position F, the cores will be entirely free therefrom. At the position F, jets of compressed air are directed against the edges of the web connecting the cones of the baked product, and these jets loosen the baked product from the mold as heretofore described, so that the operator can readily lift the connected cones from the mold and stack them as the mold passes from position F to position A. This completes the cycle of operations.

It will, therefore, be seen that the invention accomplishes its objects. A novel method and apparatus are provided for the baking of pastry cones which is simple and effective. It is found in practice that in accordance with this method and apparatus, sticking of the baked product to the baking elements is positively prevented, even though no grease is used. Accordingly, the employment of grease for greasing may be entirely eliminated, therefore, not only eliminating expense and impairment of the flavor of the baked product, but also providing for a sanitary method of eleminating all odors and gumming of the baking elements and connected parts.

Some of the mechanism shown and described in this application is not claimed herein but is claimed in application Serial Number 269,706, filed January 4, 1919.

While there is described one form of machine for performing the method and while the method has been exemplified by mechanism, it is to be understood that this mechanism is described as an example. It is further obvious that various changes may be made in details without departing from the spirit of this invention; it is, therefore, to be understood that this invention is not to be limited to the specific details shown and described.

Having thus described the invention, what is claimed is:

1. The method of making pastry cones in cooperating mold-core baking elements comprising, depositing the batter in the heated mold, inserting the core into the mold, permitting said core to rest in said mold for a predetermined period in order to permit escape of steam and air, thereafter applying to the cooperating elements and for a predetermined period, an additional yielding closing pressure increasing gradually from a light pressure to the final pressure, in order to work the batter into the mold and maintaining the final pressure while the batter is baking.

2. The method of making pastry cones in cooperating mold-core baking elements comprising, depositing the batter in the heated mold, inserting the core into the mold, permitting said core to rest in said mold for a predetermined period in order to permit escape of steam and air, thereafter applying to the cooperating elements and for a predetermined period, an additional yielding closing pressure increasing gradually from a light pressure to the final pressure while the mold is being heated, in order to work the batter into the mold, and maintaining the final pressure while the batter is baking.

3. The method of making pastry cones in cooperating mold-core baking elements comprising, depositing the batter in the heated mold, inserting the core into the mold, permitting said core to rest in said mold for a predetermined period in order to permit escape of steam and air, thereafter applying to the cooperating elements and for a predetermined period, an additional intermittent closing pressure increasing gradually from a light pressure to the final pressure, in order to work the batter into the mold, and maintaining the final pressure while the batter is baking.

4. The method of making pastry cones in cooperating mold-core baking elements comprising, depositing the batter in the heated mold, inserting the core into the mold, permitting the core to rest in the mold for a predetermined period in order to permit escape of the steam and air, thereafter applying to the core and during a predetermined preliminary period, an additional yielding closing pressure increasing gradually from a light pressure to the final pressure, in order to work the batter into the mold cavity between the mold and the core, and separately locking the cooperating elements together after the application of the final pressure.

5. The method of making pastry cones in cooperating mold-core baking elements comprising, depositing the batter in the heated mold, inserting the core into the mold, permitting the core to rest in the mold, thereafter applying to the cooperating elements and for a predetermined period, an additional yielding closing pressure increasing gradually from a light pressure to the final pressure, and maintaining the cooperating elements under a yielding closing pressure while the batter is baking.

6. The method of making pastry cones in which the batter is baked in cooperating mold-core baking elements, characterized by the feature that a violent blow is applied to the core and in a direction to separate it from the mold, whereby the core is positively broken from the baked product, leaving the latter in the mold.

7. In the art of making pastry cones in which the batter is baked in cooperating mold-core baking elements, the process of separating the baked core comprising, imparting a violent blow to one of the cooperating elements and in a direction to move it quickly away from the other of the cooperating elements.

8. In the art of making pastry cones in which the batter is baked in cooperating mold-core baking elements, the process of separating the baked core comprising, imparting a violent blow to the core and in a direction to move it quickly away from the mold.

9. A method of making pastry cones in which the batter is baked in cooperating mold-core baking elements, characterized by the feature that a blast is directed at the edge of the baked product to separate it from the baking element.

10. A method of making pastry cones in which the batter is baked in cooperating mold-core baking elements, characterized by the feature that a blast is directed on the baking element and at the edge of the baked product to separate it from the baking element.

11. A method of making pastry cones in which the batter is baked in cooperating mold-core baking elements, characterized by the feature that a blast is directed on and at an angle to the baking element and at the edge of the baked product to separate it from the baking element.

12. A method of making pastry cones in which the batter is baked in cooperating mold-core baking elements, characterized by the feature that the core is broken from the baked product, leaving the latter in the mold, and that a blast is directed at the edge of the baked product to separate it from the mold.

13. The method of making pastry cones in cooperating mold-core baking elements comprising, depositing the batter in the heated mold, inserting the core into the mold, applying an increasing pressure to the cooperating elements, maintaining the final pressure while the batter is baking, breaking the core from the baked product, leaving the latter in the mold, and directing a blast at the edge of the baked product to separate it from the mold.

14. In a machine of the class described, a traveling frame, cooperating mold-core baking elements mounted thereon, means operating, in timed relation with said frame for moving the core into the filled mold so as to rest therein, means operating after a predetermined interval adapted to apply a yielding closing pressure to the cooperating elements, and means operating after a predetermined interval adapted to yieldingly lock the cooperating elements closed.

15. In a machine of the class described, a traveling frame, cooperating core-mold baking elements thereon, means for moving the core into the filled mold, means for applying a yielding closing pressure to the cooperating elements, and impact means adapted to break the core from the baked product so as to leave the latter in the mold.

16. In a machine of the class described, a traveling frame, cooperating core-mold baking elements thereon, means for moving the core into the filled mold, means for applying a yielding closing pressure to the cooperating elements, means for maintaining the final pressure while the batter is baking, and impact means adapted to break the core from the baked product so as to leave the latter in the mold.

17. In a machine of the class described, a traveling frame, cooperating core-mold baking elements thereon, means for moving the core into the filled mold, means for applying a yielding closing pressure to the cooperating elements, means adapted to break the core from the baked product so as to leave the latter in the mold, and means for separating the baked product from the mold.

18. In a machine of the class described, a traveling frame, cooperating core-mold baking elements thereon, means for moving the core into the filled mold, means for applying a yielding closing pressure to the cooperating elements, means for maintaining the final pressure while the batter is baking, means adapted to break the core from the baked product so as to leave the latter in the mold, and means for separating the baked product from the mold.

19. In a machine of the class described having cooperating baking elements, characterized by the provision of a yielding shank on one of the cooperating elements adapted for engagement by operating means, and a locking device adapted to engage said shank.

20. In a machine of the class described having a traveling frame and cooperating baking elements thereon, characterized by the provision of yielding shanks on the movable elements, and operating means in the path of said shanks.

21. In a machine of the class described having a traveling frame and cooperating baking elements thereon, characterized by the provision of yielding shanks on the movable elements, operating means in the path of said shanks, and locking devices adapted to engage said shanks.

22. In a machine of the class described having a traveling frame and cooperating movable baking elements thereon, characterized by the provision of yielding shanks on the movable elements, and a closing member in the path of and engaged by said shanks.

23. In a machine of the class described having a traveling frame and cooperating movable baking elements thereon, characterized by the provision of yielding shanks on the movable elements, and an impact member in the path of and engaged by said shanks.

24. In a machine of the class described, a traveling frame, a series of cooperating relatively movable opposed baking elements thereon, a resilient mounting on said frame for the movable of said elements, and means for operating the movable element in order to yieldingly cooperate with the opposed element.

25. In a machine of the class described, a traveling frame, a series of cooperating relatively movable opposed baking elements thereon, a resilient mounting on said frame for the movable of said elements, means for operating the movable element in order to yieldingly cooperate with the opposed element, and means for locking said elements closed.

26. In a machine of the class described, a traveling frame, a series of cooperating relatively movable opposed baking elements thereon, a resilient mounting on said frame for the movable of said elements, means for operating the movable element in order to yieldingly cooperate with the opposed element, means for locking said elements closed, and means for applying and releasing said locking means.

27. In a machine of the class described, a rotating frame, cooperating relatively movable baking elements arranged radially of said frame, and means for resiliently mounting the movable of said elements on said frame.

28. In a machine of the class described, a rotating frame, cooperating relatively movable baking elements arranged radially on said frame, and means for resiliently mounting the movable of said elements at their inner ends on said frame.

29. In a machine of the class described, a rotating frame, cooperating relatively movable baking elements arranged radially on said frame, and means for resiliently mounting each of the movable of said elements, at one end on said frame, and means for operating said movable elements at their other ends.

30. In a machine of the class described, a rotating frame, cooperating relatively movable baking elements arranged radially on said frame, means for resiliently mounting the movable of said elements at their inner ends on said frame, and operating means cooperating with the outer ends of said elements.

31. In a machine of the class described, a rotating frame, cooperating relatively movable baking elements arranged radially on said frame, means for resiliently mounting the movable of said elements at their inner ends on said frame, and locking means cooperating with the outer ends of said elements.

32. In a machine of the class described, a rotating frame, cooperating relatively movable baking elements arranged radially on said frame, means for resiliently mounting the movable of said elements at their inner ends on said frame, locking means cooperating with the outer ends of said elements, and means for applying and releasing said locking means.

33. In a machine of the class described having a traveling frame and cooperating baking elements thereon, characterized by the provision of an impact member in the path of and engaging said elements adapted to open said elements, said impact member having an extension for holding the opened elements separated.

34. In a machine of the class described having a traveling frame and cooperating baking elements thereon, characterized by the provision of an impact member in the path of and engaging said elements adapted to open said elements, said impact member having an extension for holding the opened elements separated, and means for completely separating the opened elements.

35. In a machine of the class described, a pair of cooperating baking elements, comprising, a mold, a core support, and a carrier adapted to adjustably sustain said support adapted to permit adjustment of the cores in the mold.

36. In a machine of the class described, a pair of cooperating baking elements, comprising, a mold, a core support, means for maintaining said mold and support separated when in cooperative relation, and a carrier supported to yieldingly sustain said support.

37. A pastry cone baking machine comprising, an oven, a traveling frame, cooperating mold-core baking elements mounted thereon and adapted to pass through said oven, means for depositing batter in the heated mold, means for inserting the cores into the molds adapted to permit the same to rest therein for a predetermined period in order to permit escape of steam and air, means operating thereafter for applying to the cooperating elements and for a predetermined period an additional yielding closing pressure increasing gradually from a light pressure to the final pressure in order to work the batter into the mold, and means for maintaining the final pressure while said elements pass through said oven.

38. A pastry cone baking machine comprising, an oven, a traveling frame, cooperating mold-core baking elements mounted thereon and adapted to pass through said oven, means for depositing batter in the heated mold, means for inserting the cores into the molds adapted to permit the same to rest therein for a predetermined period in order to permit escape of steam and air, means operating thereafter for applying to the cooperating elements and for a predetermined period an additional yielding closing pressure increasing gradually from a light pressure to the final pressure while the cooperating elements pass into the oven, in order to work the batter into the mold, and means for maintaining the final pressure while said elements pass through said oven.

39. A pastry cone baking machine comprising, an oven, a traveling frame, cooperating mold-core baking elements mounted thereon and adapted to pass through said oven, means for depositing batter in the heated mold, means for inserting the cores into the molds adapted to permit the same to rest therein for a predetermined period in order to permit escape of steam and air, means operating thereafter for applying to the cooperating elements and for a predetermined period an additional intermittent closing pressure increasing gradually from a light pressure to the final pressure in order to work the batter into the mold, and means for maintaining the final pressure while said elements pass through said oven.

40. A pastry cone baking machine comprising, an oven, a traveling frame, co-operating mold-core baking elements mounted thereon and adapted to pass through said oven, means for depositing batter into the heated mold, means for inserting the cores into the molds adapted to permit the same to rest therein for a predetermined period in order to permit escape of steam and air, and means operating thereafter for applying to the co-operating elements and for a predetermined period, an additional yielding closing pressure increasing gradually from a light pressure to the final pressure in order to work the batter into the mold, and means for separately locking the cooperating elements together after the application of the final pressure.

In testimony whereof I affix my signature.

CHARLES F. BETZ.